United States Patent
Gibson et al.

(10) Patent No.: US 9,405,894 B2
(45) Date of Patent: Aug. 2, 2016

(54) SYSTEM, METHOD AND COMPUTER PROGRAM FOR CONDUCTING TRANSACTIONS REMOTELY WITH AN AUTHENTICATION FILE

(75) Inventors: Matthew Gibson, Toronto (CA); John H. D. Wiltshire, Toronto (CA); Ravi Vipool Balmukund Dave, Scarborough (CA)

(73) Assignee: SYNGRAFII INC., Toronto (CA)

( * ) Notice: Subject to any disclaimer, the term of this patent is extended or adjusted under 35 U.S.C. 154(b) by 1267 days.

(21) Appl. No.: 12/988,960

(22) PCT Filed: Apr. 21, 2009

(86) PCT No.: PCT/CA2009/000513
§ 371 (c)(1),
(2), (4) Date: Jan. 17, 2011

(87) PCT Pub. No.: WO2009/129609
PCT Pub. Date: Oct. 29, 2009

(65) Prior Publication Data
US 2011/0122449 A1    May 26, 2011

Related U.S. Application Data

(60) Provisional application No. 61/046,536, filed on Apr. 21, 2008.

(51) Int. Cl.
*G06F 17/00* (2006.01)
*G06F 21/33* (2013.01)
(Continued)

(52) U.S. Cl.
CPC .............. *G06F 21/33* (2013.01); *G06Q 10/101* (2013.01); *H04N 7/141* (2013.01); *G06F 21/30* (2013.01)

(58) Field of Classification Search
CPC .. G06F 21/30; G06F 17/241; G06F 17/30035

USPC ......................................................... 715/230
See application file for complete search history.

(56) References Cited

U.S. PATENT DOCUMENTS 5,774,571 A * 6/1998 Marshall ............... G06F 3/0346
382/119
5,818,955 A    10/1998 Smithies et al.
(Continued)

FOREIGN PATENT DOCUMENTS

EP         1445719 A1    8/2004
JP       05324179 A     12/1993
(Continued)

OTHER PUBLICATIONS

Patent Cooperation Treaty Office, International Search Report and Written Opinion Dated Jul. 24, 2009, issued in PCT Application No. PCT/CA2009/000513.
(Continued)

*Primary Examiner* — Andrew McIntosh
(74) *Attorney, Agent, or Firm* — Norton Rose Fulbright Canada LLP

(57) ABSTRACT

A transaction system and method is provided that ensures a high degree of non-repudiation. The transaction system may include a media conferencing terminal and a client computer on each end of the transaction. The system may be linked via a network such as the Internet so that transactions may be conducted between remote locations. The media conferencing terminal ensures that each party to the transaction may be satisfied as to the identity of the other parties. The method includes recording the pressure, speed and acceleration of annotations made to digital documents that are used for conducting transactions. The system is operable to store all media conferencing information, digital document information, and annotation information such that the information can be later recovered to reproduce the transaction, proving a high degree of non-repudiation.

15 Claims, 3 Drawing Sheets

(51) Int. Cl.
*G06Q 10/10* (2012.01)
*H04N 7/14* (2006.01)
*G06F 21/30* (2013.01)

(56) References Cited

U.S. PATENT DOCUMENTS

| | | | |
|---|---|---|---|
| 6,064,751 | A | 5/2000 | Smithies et al. |
| 6,307,956 | B1 | 10/2001 | Black |
| 6,351,271 | B1 | 2/2002 | Mainwaring et al. |
| 6,539,101 | B1 | 3/2003 | Black |
| 6,766,356 | B1 | 7/2004 | Krautter |
| 7,221,781 | B2 | 5/2007 | Silverbrook et al. |
| 2001/0055411 | A1 | 12/2001 | Black |
| 2002/0025062 | A1 | 2/2002 | Black |
| 2003/0081014 | A1 | 5/2003 | Frohlich |
| 2003/0093757 | A1* | 5/2003 | Silverbrook et al. ......... 715/512 |
| 2003/0196164 | A1 | 10/2003 | Gupta et al. |
| 2004/0034723 | A1 | 2/2004 | Giroti |
| 2004/0082316 | A1 | 4/2004 | Duran et al. |
| 2004/0236830 | A1 | 11/2004 | Nelson et al. |
| 2005/0004978 | A1 | 1/2005 | Reed et al. |
| 2005/0020303 | A1* | 1/2005 | Chan .......................... 455/556.1 |
| 2005/0102502 | A1 | 5/2005 | Sagen |
| 2005/0177389 | A1* | 8/2005 | Rakowicz et al. ................ 705/1 |
| 2006/0129841 | A1 | 6/2006 | Lapstun et al. |
| 2007/0263078 | A1 | 11/2007 | Shah et al. |
| 2007/0288569 | A1* | 12/2007 | Yuan et al. .................... 709/204 |
| 2008/0152202 | A1* | 6/2008 | Moise ...................... G06K 9/24 382/120 |
| 2009/0006410 | A1 | 1/2009 | Choi |
| 2009/0210491 | A1 | 8/2009 | Thakkar et al. |
| 2009/0210789 | A1 | 8/2009 | Thakkar et al. |
| 2009/0234795 | A1 | 9/2009 | Haas et al. |
| 2011/0016095 | A1 | 1/2011 | Anglin et al. |

FOREIGN PATENT DOCUMENTS

| | | |
|---|---|---|
| WO | 03048909 A2 | 5/2003 |
| WO | 2007128131 A1 | 11/2007 |

OTHER PUBLICATIONS

European Patent Office, Communication pursuant to Rules 161(2) and 162 EPC Dated Nov. 30, 2010, issued in European Patent Application No. 09735611.7.
Haseltine Lake LLP, Response Dated Dec. 30, 2010 submitted on European Patent Application No. 09735611.7.
European Patent Office, Extended European Search Report Dated Nov. 22, 2012, issued in European Patent Application No. 09735611.7.
Haseltine Lake LLP, Response to EESR Dated Jun. 20, 2013 submitted on European Patent Application No. 09735611.7.
European Patent Office, Communication pursuant to Rules 70(2) and 70a(2) EPC Dated Dec. 11, 2012, issued in European Patent Application No. 09735611.7.
United States Patent and Trademark Office, Office Action Dated Mar. 16, 2011, issued in U.S. Appl. No. 12/427,070.
Miller Thomson LLP, Office Action Response Dated Sep. 16, 2011, submitted on U.S. Appl. No. 12/427,070.
United States Patent and Trademark Office, Office Action Dated Dec. 2, 2011, issued in U.S. Appl. No. 12/427,070.
Miller Thomson LLP, Office Action Response Dated Jun. 4, 2012, submitted on U.S. Appl. No. 12/427,070.
United States Patent and Trademark Office, Office Action Dated Oct. 3 2012, issued in U.S. Appl. No. 12/427,070.
Norton Rose Canada LLP, Office Action Response Dated Apr. 3, 2013, submitted on U.S. Appl. No. 12/427,070.
United States Patent and Trademark Office, Office Action Dated Jun. 28, 2013, issued in US Patent U.S. Appl. No. 12/427,070.
Norton Rose Fulbright Canada LLP, Office Action Response Dated Nov. 27, 2013, submitted on U.S. Appl. No. 121427,070.
European Patent Office, Office Action for EP Application No. 09735611.7 dated Feb. 9, 2016.

* cited by examiner

SYSTEM, METHOD AND COMPUTER PROGRAM FOR CONDUCTING TRANSACTIONS REMOTELY WITH AN AUTHENTICATION FILE

The present application is a national stage application under 35 U.S.C. 371 of PCT application No. PCT/CA2009/000513 filed Apr. 21, 2009, which in turn claims the benefit under 35 U.S.C. 119(e) of U.S. Provisional Ser. No. 61/046,536, filed Apr. 21, 2008, the contents of each of which are hereby incorporated by reference into the present disclosure.

FIELD OF THE INVENTION

The present invention relates generally to conducting transactions remotely. The present invention relates more specifically to recording transactions and authenticating individuals for the purposes of non-repudiation using digital handwriting authentication, digital document management, and media conferencing.

BACKGROUND OF THE INVENTION

Generally, parties to a transaction are required to attend at a single physical location in order to transact. For example, parties signing a contract are typically required to attend in a room or an office to sign the contract in the presence of one another. In another example, a person charged with a crime may be required to attend before a judge in a court of law to determine whether the person may be discharged pending a trial.

There has for a long time been technology that presumably would allow parties to transact from geographically remote locations. For example, telephones and live television broadcast capabilities have existed for years. The hesitancy to utilize these means for transacting, however, is based at least partially on the fact that an individual may not have a high degree of confidence that the person they are transacting with using these methods is actually the person they purport to be.

What has not been achieved to date is an invention that allows individuals to transact with each other remotely while retaining a high degree of confidence that the person they are transacting with is actually the person they purport to be. The present invention combines known technologies in a novel way to provide a high degree of confidence for this purpose. The known technologies generally include digital handwriting analysis and digital media conferencing.

A variety of transaction systems have been invented over the years. Many of these systems rely on digital signature capture and verification.

U.S. issued patents U.S. Pat. Nos. 7,221,781; 6,539,101; 6,307,956; 6,064,751; 5,818,955; and application 20060129841 all disclose a system and/or method of digital signature analysis.

U.S. Pat. No. 7,221,781 patent to Silverbrook et al. discloses a system for registering a user with a sensing device using a form, the form having at least one signature field and coded data at least partially indicative of the signature field. When moved about the form, the sensing device senses the coded data and generates biometric information. The sensing device is typically an electronic pen/stylus consisting of an image sensor. The system is operable to record both pressure and acceleration associated with pen strokes.

U.S. application 20060129841 to Lapstun et al. discloses a method and system for user registration using coded marks. This application is related to the Silverbrook patent.

U.S. Pat. No. 6,539,101 to Black discloses a method for identity verification. Black consists primarily of a stylus operable to sense a fingerprint and thumbprint. Additionally, the stylus is operable to record pressure (point pressure and grip pressure), acceleration, finger positions, and other metrics.

U.S. Pat. No. 6,307,956 to Black discloses a writing implement for identity verification system. This patent is a related system patent to the above method patent U.S. Pat. No. 6,539,101.

U.S. Pat. No. 6,064,751 to Smithies et al. discloses a document and signature data capture system and method. Smithies claims a capture module operable to measure certain features of the act of signing, such as size, shape, and relative positioning of curves, loops, lines, dots, crosses, and other features of the signature as well as the relative speed at which the signature is being written. Smithies claims the use of acceleration and deceleration of the pen stroke, but not pressure at the pen point.

U.S. Pat. No. 5,818,955 to Smithies et al. discloses a document and signature verification system and method. This patent is a related verification patent to the above capture patent U.S. Pat. No. 6,064,751.

Current technology enables the possibility to perform business and legal transactions without the need for geographical proximity. There are a great number of computers connected to the Internet, each of which is operable to communicate with each of the others. What has not been accomplished to date is a system and method to harness this capability for the purposes of business and legal transactions in a way that substantially prevents repudiation.

Repudiation refers to a party's denial of assent to a particular transaction or agreement. Traditionally, parties evidenced assent by providing their signatures written in ink on a piece of paper. Generally, such evidence provides a presumption of assent. However, where a party to a particular transaction or agreement does deny assent where it is evidenced by a signature, such a signature could be analysed by a forensic handwriting analyst. The forensic handwriting analyst may refer to various aspects of a signature, and a handwriting sample provided by the party denying assent, to determine whether the signature was actually written by that party. These aspects may include pressure differential in a pen stroke, direction of writing, dimensions of loops in certain characters, and so on.

When transacting remotely using digital means such as web-enabled conferencing, the prior art is unable to provide the same level of non-repudiation that exists in traditional paper-based means. There has not been, until now, the ability for a forensic handwriting analyst to examine signatures or other handwriting samples provided digitally.

On the basis of the foregoing, what is needed is a system and method for conducting transactions remotely using digital handwriting authentication, digital document management, and media conferencing that provides for a substantially high degree of non-repudiation.

SUMMARY OF THE INVENTION

In one aspect of the present invention, a method for conducting and recording transactions remotely is provided, the method comprising: (a) establishing a media conference between a plurality of media conferencing terminals; (b) linking a plurality of computers each operable to display a digital document synchronized by a transaction session; (c) recording a plurality of annotations inputted on one or more of the plurality of computers; and (d) creating an authentication file that authenticates the digital document by: (i) storing the digital document and the plurality of annotations; and (ii) storing audio data and video data corresponding to the media conference.

In another aspect of the present invention, a transaction system is provided, the transaction system comprising: (a) a plurality of computers each including an input means, a display means, a network connection and a media recording means; (b) a plurality of media conferencing terminals each including an input means and an output means; and (c) a transaction utility linked to each of the plurality of computers or loaded on the plurality of computers, the transaction utility operable to: (i) establish a media conference between the plurality of media conferencing terminals; (ii) link the plurality of computers and display on the display means of each of the plurality of computers a digital document synchronized by a transaction session; (iii) record a plurality of annotations inputted using the input means of one or more of the plurality of computers; and (iv) create an authentication file that authenticates the digital document by: (A) storing the digital document and the plurality of annotations; and (B) storing audio data and video data corresponding to the media conference.

In yet another aspect of the present invention, a file system is provided, each file in said file system comprising a plurality of digital documents, a plurality of digital document identification numbers, a plurality of annotations files, a plurality of media stream files, a plurality of files each file identifying a computer identification number corresponding to one of a plurality of client computers, a plurality of interne protocol addresses corresponding to each of the client computers, a plurality of date stamps, and a plurality of time stamps.

In a yet further aspect of the present invention, a computer program is provided, the compute program comprising computer instructions which when made available to a computer are operable to define in relation to the computer a remote transaction utility that is operable to: (a) establish a media conference between a plurality of media conferencing terminals; (b) link a plurality of computers each operable to display a digital document synchronized by a transaction session; (c) record a plurality of annotations inputted on one or more of the plurality of computers; and (d) create an authentication file that authenticates the digital document by: (i) storing the digital document and the plurality of annotations; and (ii) storing audio data and video data corresponding to the media conference.

BRIEF DESCRIPTION OF THE DRAWINGS

A detailed description of the preferred embodiments is provided herein below by way of example only and with reference to the following drawings, in which.

Figure 1:
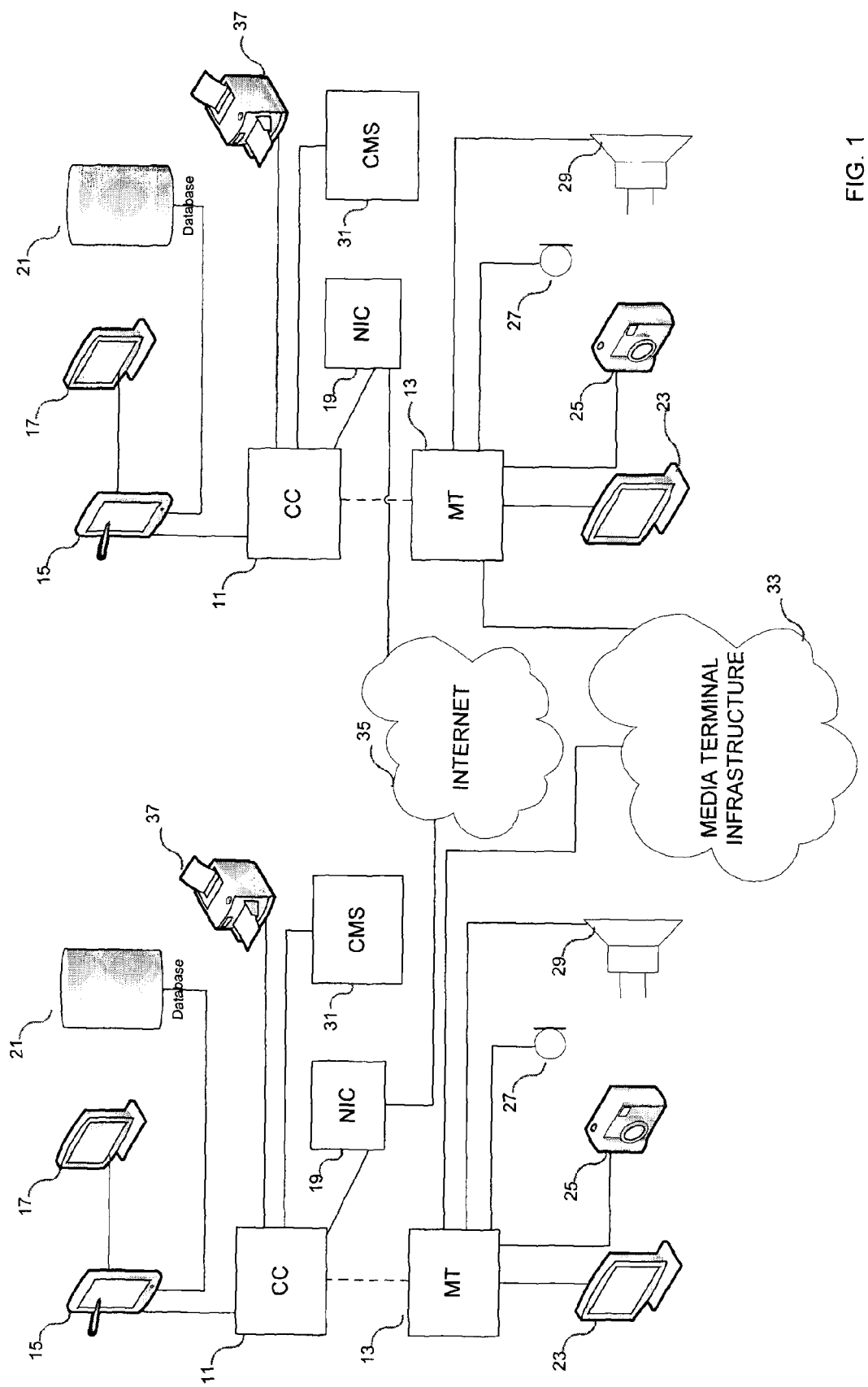
FIG. 1 illustrates one aspect of a system of the present invention operable to conduct a remote transaction.

In the drawings, one embodiment of the invention is illustrated by way of example. It is to be expressly understood that the description and drawings are only for the purpose of illustration and as an aid to understanding, and are not intended as a definition of the limits of the invention.

DETAILED DESCRIPTION OF THE INVENTION

Co-pending U.S. patent application Ser. No. 11/720,249 (the "co-pending application") is included in its entirety.

The present invention discloses a system and method for conducting transactions remotely (the "transaction system") that provides for a substantially high degree of non-repudiation.

More particularly, the present invention discloses a system and method for digital handwriting authentication, digital document management, and media conferencing that may be operable to record a plurality of characteristics of an individual's handwriting, a plurality of handwriting movements, a base document or image, a media stream, and other data for the purposes of providing a secure authentication method that is highly preventive of repudiation.

System Overview and Example Embodiment

FIG. 1 illustrates one aspect of a transaction system of the present invention operable to conduct a remote transaction.

The transaction system may enable parties to input and receive audio, visual and electronic data simultaneously for the purposes of authentication of the parties, authentication of electronic data exchanged by the parties, and storage of information corresponding to a transaction. The transaction system may further enable parties to replicate a live transaction without the need for geographical proximity.

The following is one implementation of the transaction system and associated computer program. It will be appreciated that there are many variations of the following implementation which do not depart from the spirit of the present invention.

In the transaction system, each party attends at both a data terminal 11 which will be referred to as a "client computer" 11; and a media conferencing terminal 13, such as a telephone conferencing, video conferencing, or web conferencing terminal which will be referred to as a "media terminal" 13. Optionally, the client computer and the media terminal 13 may be provided on a common device such as a multimedia computer.

Each client computer 11 may comprise a digital writing tablet 15 which itself comprises input means such as a stylus 16, display means 17, a network connection 19 and a media recording means 21. The display means 17 may be operable to display a digital document. The media terminal may comprise a display means 23, a camera 25, a microphone 27, and a plurality of audio speakers 29.

The client computer 11 may be operable to function as a content manager. The content manager system 31 may associate with the media terminal 13 using the media recording means 21 of the client computer 11, such that the content manager system 31 may be aware of the existence of the media terminal 13 and may monitor the media terminal's 13 connection status. Furthermore, the client computer 11 may be operable to intercept and record the media stream exchanged by the media terminal 13 with a remote media terminal, when in use.

In a typical usage of the transaction system each party may attend at its respective client computer 11 and media terminal 13. It is assumed for the purposes of the following description that each client computer 11 may already contain a set of profiles, which will be described in further detail under the "Profiles" heading. Further specific components of the transaction system mentioned in the following description are also described below under the corresponding headings.

The parties may establish a media conference using means provided by the media terminal infrastructure 33. Such means may be, for example, dialling from one media terminal 13 a number associated with a remote media terminal; or selecting from one media terminal 13 a remote media terminal from a pre-existing list of remote media terminals.

The client computers' 11 content managers 31 may become aware that a media conference is established, and each client computer 11 thus begins intercepting and recording the media stream exchanged by the media terminals 13. The transaction system may record a date stamp and a time stamp corresponding to the moment the media conference is established.

The client computers 11 may also be operable to determine whether there is a corresponding client computer on the other side of the media conference. In this example, each side of the media conference is equipped with a client computer 11. Each client computer 11 is thus aware of the existence of the other client computer 11 through a network such as the Internet 35. Furthermore, the client computers 11 may associate with each other using a proprietary or known computer networking protocol, such as Transmission Control Protocol/Internet Protocol (TCP/IP). The client computers 11 may thus be operable to exchange data for the duration of the transaction.

One of the parties may direct the transaction system to display a digital document on the display means 17 of each client computer 11 using a digital document load command. A date stamp and time stamp may be stored corresponding to the moment the digital document load command is executed.

The digital document may, for example, be a contract that each party desires to be executed by the other party, such that the two parties enter into the contract. Each party may desire that the other party "authenticate", such that the party executing the contract is in fact the party that purports to enter into the contract.

The parties may decide between themselves, orally using the media terminals 13 and media terminal infrastructure 33, which party will authenticate first. For the purposes of authentication, one of the two parties may provide its signature or other handwriting using the input means. The transaction system may generate a profile based on the inputted annotations. The transaction system may then compare the generated profile to the plurality of stored profiles. The party may be authenticated once a match is found to one of the stored profiles. The party may then verbally direct the second party to authenticate in a similar fashion. At no time may any annotation be removed from the system.

As each party begins inputting these annotations to the digital document the client computers 11 record the media stream from the "active" client computer. A date stamp and a time stamp may be stored corresponding to the moment the party begins making annotations.

Furthermore, each time a different party begins to speak, the client computers 11 begin to record the media stream corresponding to the speaking party. A date stamp and time stamp may be stored corresponding to each moment the "active" stream switches between the parties.

The recorded media stream thus comprises a combination of the media streams recorded from each side of the transaction, with the effect that the recorded media stream consists of the "active" media stream at all times.

The parties may then choose to input various other annotations to the documents. The system directs the media stream to record the stream corresponding to the party inputting annotations. A date stamp and time stamp may be stored corresponding to the moments the stream switches between the parties. Generally, parties will establish between themselves, orally using the media terminals 13, which of the parties is to input annotations at any given time.

Alternatively, the transaction system may provide a control command that "locks" the ability to input annotations to one of the two client computers 11. In this embodiment, one party may direct the other party to input annotations by selecting the control command, which transfers control of the digital document to the other party.

The transaction carries on according to the above description.

Optionally, before terminating the transaction the parties may choose to print a copy of the digital document and annotations using a print command provided by the client computers 11. The digital document and annotations may be printed on a printing means 37 such as a laser printer, inkjet printer, or the means provided in the co-pending application. A date stamp and time stamp may be stored corresponding to the moment the print command is issued.

When the parties orally decide to conclude the transaction, one of the parties may choose to terminate the transaction using a termination command provided on the client computers 11. At this time, a date stamp and a time stamp may be stored. Alternatively, the parties may choose to terminate the transactions using the termination process provided by the media terminals. Since the client computers 11 may be operable to monitor the connection status of the media terminals, a date stamp and a time stamp may be stored based on the termination time of the media conferencing connection.

Finally, at the conclusion of the transaction, a secure electronic data file is stored at one of the client computers and copied to the second of the client computers, the secure electronic data file being comprised of the components described below.

Storage

Figure 2:
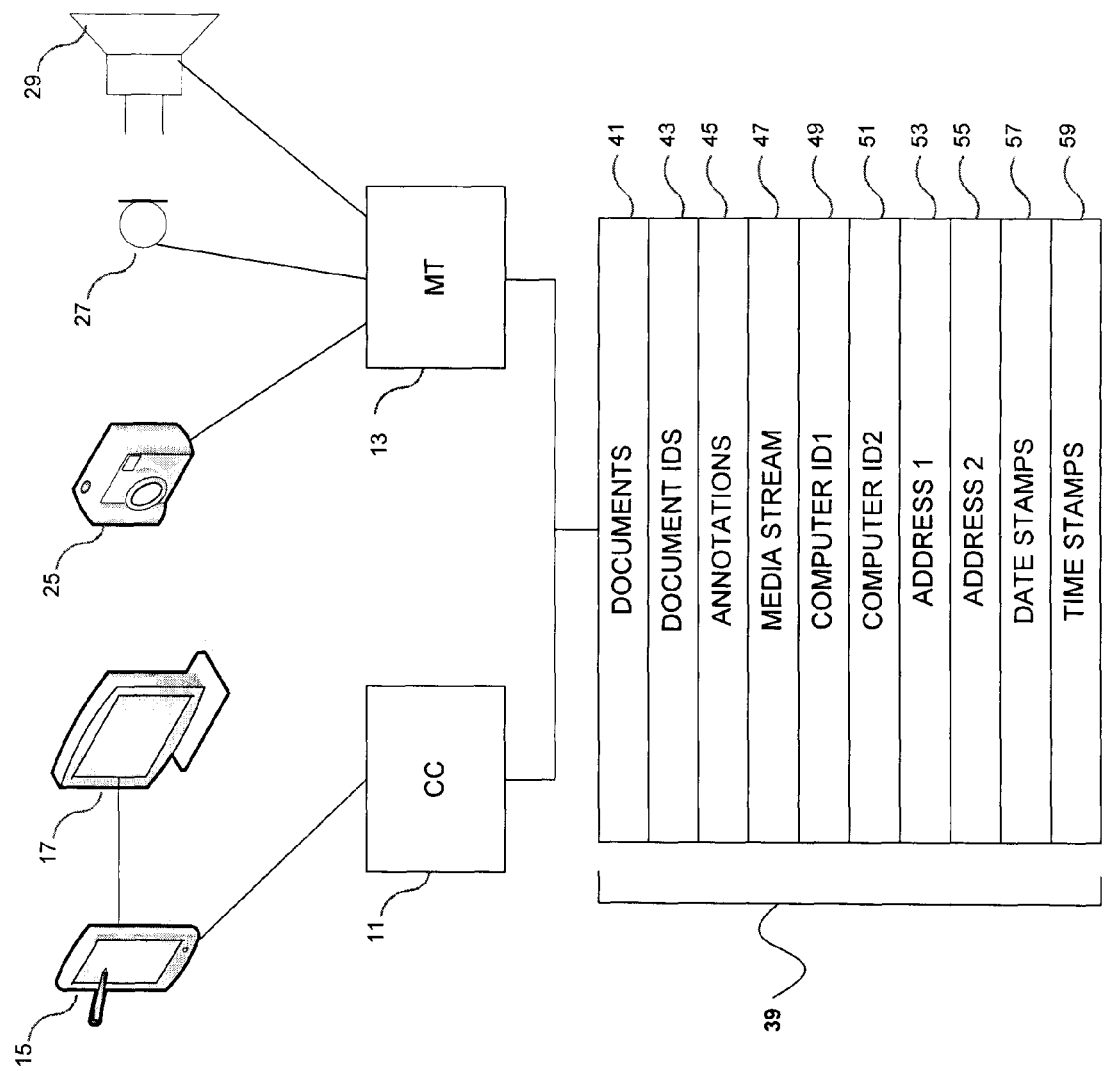
FIG. 2 illustrates one aspect of a secure electronic data file operable to index a plurality of data files relating to a remote transaction carried out using the system and method of the present invention.

FIG. 2 illustrates one aspect of a secure electronic data file operable to index a plurality of data files relating to a remote transaction carried out using the system and method of the present invention.

One object of the transaction system is to combine information generated from the tablet, 15 stylus 16, camera 25, microphone 27, and speakers 29 into a secure electronic data file 39. The secure electronic data file 39 may be, therefore, preferably comprised of the following information: a plurality of digital documents 41, a plurality of digital document identification numbers 43, a plurality of annotations files 45, a media stream file 47, a file identifying an originating computer identification number corresponding to one of the client computers 49, a file identifying a receiving computer identification number corresponding to a second of the client computers 51, interne protocol addresses corresponding to each of the client computers 53, 55, a plurality of date stamps 57, and a plurality of time stamps 59. The plurality of date stamps 57 and the plurality of time stamps 59 correspond to events occurring during a transaction, including when a party to the transaction inputs data using the input means such as the stylus 16, or when a party to the transaction speaks into the microphone 27. There may be other events that cause a date stamp and a time stamp to be generated and stored in the secure electronic data file 39.

The secure electronic data file 39 may be encrypted using a known method of digital encryption or a proprietary method of digital encryption. For example, the secure electronic data file 39 may be associated with a hash code. If the secure electronic data file 39 is tampered with, the hash code will no longer correspond to the file. Therefore, it may be possible to determine whether the secure electronic data file 39 has been tampered with.

Media-Conference

As described above, the present invention may include media recording means consisting of both audio and video recording means. Optionally, the present invention may include audio recording means without video recording means. For simplicity, the following description assumes that both audio and video recording means are present in the transaction system.

The transaction system may be operable to record a media stream consisting of audio and video corresponding to each client computer. A secure electronic data file 39 preferably consists of a single data stream.

Since there may be a plurality of client computers connected together for a particular transaction, the media stream may be operable to combine media feeds from each client computer 11. The present invention may select the client computer 11 from which to collect a media stream, at any given moment, by selecting the media stream corresponding to the client computer 11 which is collecting inputs at that moment. The inputs being collected may be an individual speaking into the microphone 27 or an individual inputting data using the input means such as the stylus 16. In other words, the media stream stored to the secure electronic data file 39 comprises, at any given moment, one of the plurality of media streams corresponding to an active client computer.

In an alternative embodiment, the media stream stored to the secure electronic data file 39 consists of all of the plurality of media streams from each client computer 11 connected in the transaction such the contents of the media stream do not depend on determining which client computer 11 is an active client computer.

Repudiation

The transaction system does not necessarily require a third party host computer to store the secure electronic data file 39. In this regard, the secure electronic data file 39 may be stored on one client computer 11 or a plurality of client computers 11 connected by network in any particular transaction. Alternatively, the parties may choose to designate a third party host computer operable to store the secure electronic data file 39.

The secure electronic data file 39, in turn, may later be used as evidence that a particular interaction took place between the parties that attended at the client computers 11 at the time the secure electronic data file 39 was created. The stored secure electronic data file 39 may be retrieved at any time from its place of storage, whether it is stored on one of the client computers 11, a plurality of client computers 11, or a third party host computer.

The secure electronic data file 39 may then be played back in its entirety or partially. If played back in its entirely, an individual may select whether to play back one or both of the media stream and the set of inputs recorded using the input means. The individual may also choose to play back a portion of the secure electronic data file, 39 the starting point of which may correspond to any of the plurality of stored date stamps and time stamps. This may be useful where the individual may desire to prove that a certain element of the transaction occurred without the need to play back the recording of the entire transaction.

Annotations

A plurality of digital documents may be displayed on the display means 17 of the tablet. The plurality of digital documents may be associated, such as to comprise a transaction involving several documents. Furthermore, each of the plurality of digital documents may consist of a plurality of pages. For simplicity, a single document consisting of one page will be used to explain the operation of the transaction system. It will be recognized by those skilled in the art that the transaction system, as described herein, is easily scalable to multi-page documents as well as multiple documents.

The digital document may be operable to receive inputs ("annotations") via the digital writing implement. The client computers may be operable to record the annotations.

In the transaction system, the tablet 15 and stylus 16 together may provide a means to measure characteristics associated with the annotations including coordinates, pressure, speed, acceleration, deceleration, and so on (collectively referred to as "characteristics"). The prior art discloses methods to provide a stylus 16 and tablet 15 that, together, may be operable to measure the characteristics.

The transaction system may be operable to retain a record of all of the characteristics of the annotations associated with a document. Furthermore, the transaction system may be operable to determine and record which one of a plurality of individuals created each of the annotations associated with a document.

The storage of these annotations may later be used to replicate the annotations on an output means, such as a laser printed, inkjet printer, or an output means described in the co-pending application.

Profile

It is well known that a particular individual's handwriting consists of unique characteristics. In turn, it is possible to determine with a relatively high degree of certainty that an individual is a particular person based solely on a handwriting analysis. The degree of certainty generally increases as more handwriting samples are created.

The prior art methods of authentication in digital documents using handwriting are limited to signature analysis. It is known to those skilled in the art that an individual's signature may change substantially each time that individual writes their signature. Although the prior art methods of digital signature analysis provide acceptable levels of certainty, the transaction system enables a substantially greater level of certainty than the prior art since the transaction system performs analysis using all annotations made to a digital document by a particular individual.

The transaction system may be operable to record each annotation made in a digital document. As a particular individual inputs annotations onto the client computer 11, the transaction system creates and stores a profile of that particular individual based on the annotations and the characteristics.

Methods of creating an individual profile based on handwriting are known to those skilled in the art. The present invention may be operable to dynamically and continuously improve the accuracy of the profile as an individual makes an increasing number of annotations using the transaction system.

Authentication

The transaction system may be operable to store a plurality of profiles corresponding to a plurality of individuals that have used the system, as described above.

Furthermore, the transaction system may be operable to authenticate a particular individual corresponding to one of a plurality of previously created profiles. In other words, the transaction system may be operable to recognize an individual that previously used the system.

An authentication process comprises analysing the annotations and the characteristics being inputted by an individual using the input means, dynamically and continuously comparing the results of the analysis to the plurality of profiles and determining whether the characteristics match to one of the plurality of profiles. Until a match has been made, the annotations and the characteristics being inputted may be stored in a new profile. Once a match has been made, the transaction system may authenticate the individual as the person matching the profile and the annotations and the characteristics may be appended to the existing profile in order to store more information corresponding to the individual. If there is no match made, the new profile may be stored and added to the plurality of profiles already in existence.

Editing

The digital document may be operable to receive annotations. Once an individual inputs an annotation to a digital document using the input means, the annotation cannot be removed; they form a part of the annotations file that comprises a portion of the secure electronic data file. 39 An individual thus cannot remove annotations for the purpose of increasing the likelihood that repudiation may be successful.

Physical Reproduction

The co-pending application discloses an apparatus, system and computer program for controlling a tool. The invention generally relates to devices and systems used to reproduce or replicate human handwriting. In one embodiment of the invention, it may be operable to reproduce human handwriting including nuances such as pressure, speed, acceleration, and deceleration when provided with the original handwriting data.

The present invention may be operable to associate with the apparatus, system and computer program disclosed in the co-pending application.

The transaction system may be operable to extract the characteristics and annotations corresponding to a digital document from the corresponding secure electronic data file. 39 Consequently, the transaction system may be operable to associate with the apparatus and system disclosed in the co-pending application for the purposes of replicating any or all of the plurality of annotations and the plurality of characteristics corresponding to the digital document. The annotations and characteristics may be outputted to a printable surface, such as a piece of paper. The annotations and characteristics will appear on a printable surface in a fashion similar to that of a traditional document written in ink on paper, including indentations, pressure differentials, and other characteristics that may be later analysed by a forensic handwriting analyst to determine which individual created the annotations for authentication purposes.

Furthermore, it may be desirable to reproduce the digital document, that is the unannotated document, prior to or following the replication process described above. The transaction system may be operable to extract the digital document from the secure electronic data file corresponding to the digital document, and may further be operable to output the digital document to a printable surface such as a piece of paper using a printer, such as one generally referred to as a laser printer or an ink-jet printer.

Implementation of the Computer Program

The transaction system may be implemented in a variety of ways. More particularly, a format may be selected for the digital document, such as portable document format, an open source writing format, Microsoft™ Word™ format or other format operable to receive annotations. Furthermore, the transaction system may be implemented as a plug-in to a commercial digital editing computer program such as Adobe™ Acrobat™, Microsoft™ Word™, or other editing program. In addition, the digital document may be an image file or any other file that may be graphically displayed on the display means of a client computer.

Service Bureau Provider Implementation

In one embodiment of the present invention, it may be possible for a dedicated web server to be hosted by a trusted source in order to facilitate the present invention. In such an embodiment the web server may operate to facilitate the management and storage of files. The web server may be operated by a source that would ensure its use as a trusted service provider.

Figure 3:
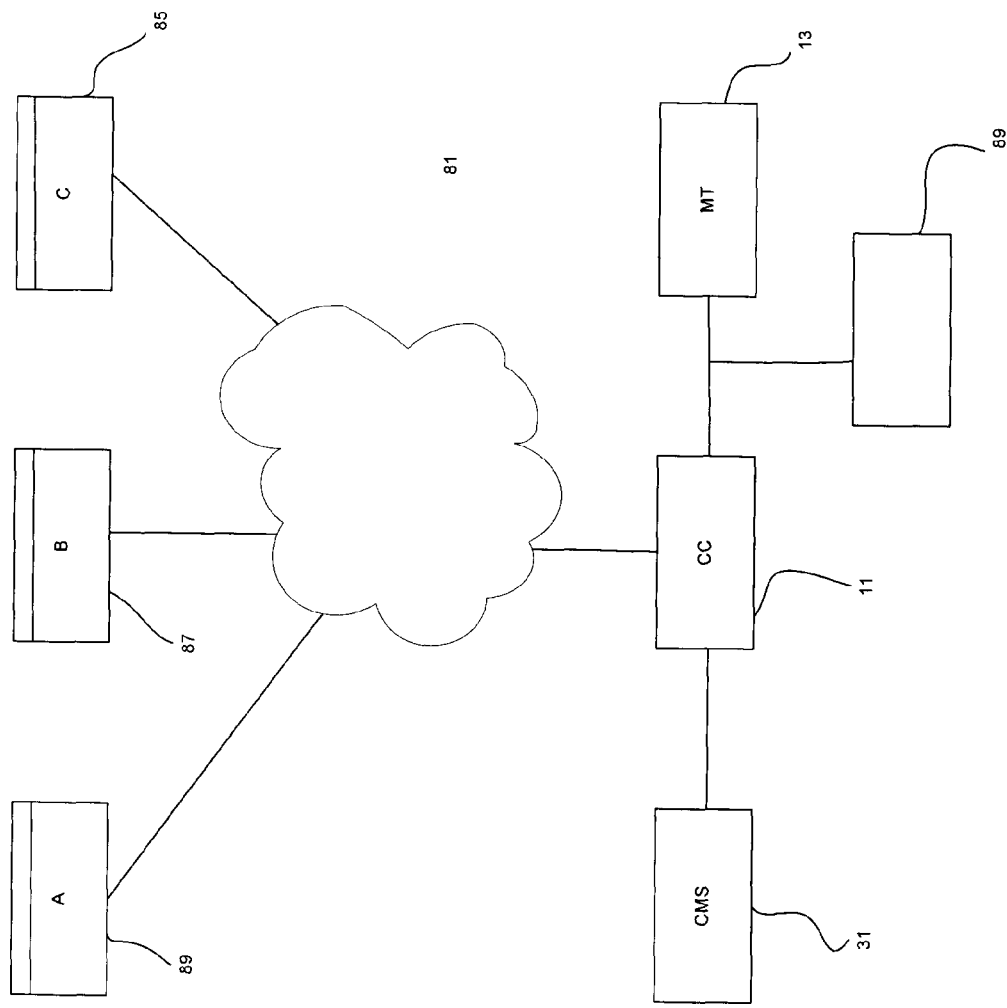
FIG. 3 illustrates a service bureau provider implementation of the present invention applying a web server hosted by a trusted source.

For example, as shown in FIG. 3, the dedicated web server 81 may facilitate the management and storage of files 83 relating to a transaction between parties A 89 and B 87. It may provide confirmation of authentication of a transaction, in accordance with the authentication method described above. It may further provide access to transactional data as a web service. Parties known to the server may be granted such access. For example, the parties to a transaction, such as Party A 89 and Party B 87, may access the transactional data. Additionally, one or more parties may be granted access to the transactional data by the parties to the transaction. For example, Party C 85 may be granted access to the transactional data. Party C must be known to the server prior to be provided with access to transactional data. The access of Party C 85 may be limited, for example, such as to read-only status, in accordance with limits agreed to by the parties to the transaction, or as set by the host of the web server. The type of transaction data accessed and the purpose of granting access may vary, for example, transactional data that enables non-repudiation of the transaction may be provided in this manner. This implementation of the present invention may apply a software as a service model.

The invention claimed is:

1. A computer-implemented method for conducting and recording transactions remotely, the method comprising:
    (a) establishing a media conference between a plurality of computers;
    (b) displaying a digital document on each of the plurality of computers;
    (c) receiving, by one or more of the plurality of computers, a plurality of annotations made to the digital document;
    (d) recording the plurality of annotations received by one or more of the plurality of computers, wherein each of the plurality of annotations comprises digital handwriting elements by at least one participant of the media conference;
    (e) generating a profile based on the digital handwriting elements for the at least one participant of the media conference;
    (f) authenticating an identity of the at least one participant by comparing the generated profile to one or more stored profiles; and
    (g) creating an authentication file that authenticates the digital document by the steps of:
        (i) storing the digital document and the plurality of annotations; and
        (ii) storing audio data and video data corresponding to the media conference;
    wherein the generated profile comprises characteristics of the digital handwriting elements by the at least one participant of the media conference, and when the generated profile matches one of the one or more stored profiles, appending the characteristics of the digital handwriting elements to the matched stored profile.

2. The method of claim 1 further comprising recording at least one of coordinates, a pressure, a speed, an acceleration, and a deceleration of each of the plurality of annotations.

3. The method of claim 2 further comprising printing the plurality of annotations using a printer that is configured to replicate the at least one of coordinates, the pressure, the speed, the acceleration, and the deceleration of each of the plurality of annotations.

4. The method of claim 1, wherein the characteristics of the digital handwriting elements comprise at least one of coordinates, pressure, speed, acceleration, and deceleration.

5. The method of claim 1 wherein the authentication file further comprises one of a date stamp and a time stamp associated with one or more events during the media conference.

6. A computer-implemented transaction system comprising:
   a plurality of computers each including an input device, a display, a network connection and a media recording device, wherein one or more of the plurality of computers is configured to:
   (i) establish a media conference between the plurality of computers;
   (ii) display on the display of each of the plurality of computers a digital document;
   (iii) receive, by one or more of the plurality of computers, a plurality of annotations made to the digital document through the input device of one or more of the plurality of computers;
   (iv) record the plurality of annotations, wherein each of the plurality of annotations comprises digital handwriting elements by at least one participant of the media conference;
   (v) generate a profile based on the digital handwriting elements for the at least one participant of the media conference;
   (vi) authenticate an identity of the at least one participant by comparing the generated profile to one or more stored profiles; and
   (vii) create an authentication file that authenticates the digital document by:
      (A) storing the digital document and the plurality of annotations; and
      (B) storing audio data and video data corresponding to the media conference;
   wherein the generated profile comprises characteristics of the digital handwriting elements by the at least one participant of the media conference, and when the generated profile matches one of the one or more stored profiles, append the characteristics of the digital handwriting elements to the matched stored profile.

7. The transaction system of claim 6 wherein the input device of one of the plurality of computer is one of: a stylus, a camera and a video recorder.

8. The transaction system of claim 6 wherein the input device is configured to record least one of coordinates, a pressure, a speed, an acceleration, and a deceleration of the each of the plurality of annotations.

9. The transaction system of claim 6 wherein the display is one of: a monitor and a video projector.

10. The transaction system of claim 6 wherein each of the plurality of computer further comprises an output device, the output device comprising one of: a plurality of audio speakers, a video monitor, and a video projector.

11. The transaction system of claim 6, wherein the characteristics of the digital handwriting elements comprise at least one of coordinates, pressure, speed, acceleration, and deceleration.

12. The transaction system of claim 6 wherein the authentication file further comprises one of a date stamp and a time stamp associated with one or more events during the media conference.

13. A non-transitory computer-readable medium storing a set of computer program instructions, which when executed by a processor, causes a computer to:
   (a) establish a media conference between a plurality of computers;
   (b) display a digital document on each of the plurality of computers;
   (c) receive, by one or more of the plurality of computers, a plurality of annotations made to the digital document;
   (d) record the plurality of annotations received by one or more of the plurality of computers, wherein each of the plurality of annotations comprises digital handwriting elements by at least one participant of the media conference;
   (e) generate a profile based on the digital handwriting elements for the at least one participant of the media conference;
   (f) authenticate an identity of the at least one participant by comparing the generated profile to one or more stored profiles; and
   (g) create an authentication file that authenticates the digital document by:
      (i) storing the digital document and the plurality of annotations; and
      (ii) storing audio data and video data corresponding to the media conference;
   wherein the generated profile comprises characteristics of the digital handwriting elements by the at least one participant of the media conference, and when the generated profile matches one of the one or more stored profiles, append the characteristics of the digital handwriting elements to the matched stored profile.

14. The non-transitory computer-readable medium of claim 13 wherein the set of computer program instructions is configured to cause the computer to record and store information corresponding to by which of the plurality of computers each of the plurality of annotations is received.

15. The non-transitory computer-readable medium of claim 13, wherein the characteristics of the digital handwriting elements comprise at least one of coordinates, pressure, speed, acceleration, and deceleration.

* * * * *